US009561772B2

(12) United States Patent
Andersson

(10) Patent No.: US 9,561,772 B2
(45) Date of Patent: Feb. 7, 2017

(54) DEVICE FOR DAMPING VIBRATIONS OF AN AIRBAG OR AN AIRBAG APPARATUS

(71) Applicant: Autoliv Development AB, Vårgårda (SE)

(72) Inventor: Stefan Andersson, Alingsas (SE)

(73) Assignee: AUTOLIV DEVEOPMENT AB, Vargarda (SE)

( * ) Notice: Subject to any disclaimer, the term of this patent is extended or adjusted under 35 U.S.C. 154(b) by 0 days.

(21) Appl. No.: 14/767,758

(22) PCT Filed: Feb. 12, 2014

(86) PCT No.: PCT/EP2014/052701
§ 371 (c)(1),
(2) Date: Aug. 13, 2015

(87) PCT Pub. No.: WO2014/124954
PCT Pub. Date: Aug. 21, 2014

(65) Prior Publication Data
US 2016/0031399 A1    Feb. 4, 2016

(30) Foreign Application Priority Data
Feb. 15, 2013   (DE) .................. 10 2013 002 557

(51) Int. Cl.
*B60R 21/20*         (2011.01)
*B60R 21/203*        (2006.01)
(52) U.S. Cl.
CPC ............. *B60R 21/203* (2013.01); *B60R 21/20* (2013.01); *B60R 21/2037* (2013.01)

(58) Field of Classification Search
CPC ..... B60R 21/20; B60R 21/203; B60R 21/2037
See application file for complete search history.

(56) References Cited

U.S. PATENT DOCUMENTS

| 5,024,464 A | * | 6/1991 | Kawaguchi | B60R 21/2037 280/731 |
| 5,333,897 A | * | 8/1994 | Landis | B60R 21/2037 200/61.54 |
| 5,410,114 A | * | 4/1995 | Furuie | B60Q 5/003 200/61.55 |

(Continued)

FOREIGN PATENT DOCUMENTS

DE        39 25 761 A1    2/1990
DE        196 53 684 A1   6/1998

(Continued)

OTHER PUBLICATIONS

PCT International Search Report—May 14, 2014.
German Examination Report—Oct. 17, 2013.

*Primary Examiner* — Laura Freedman
(74) *Attorney, Agent, or Firm* — Brinks Gilson & Lione

(57) ABSTRACT

An apparatus for damping vibrations of an airbag or of an airbag device (10) having a holder device (20) for securing the airbag or the airbag device (10) to a carrier (30), wherein the holder device (20) is secured to the carrier (30) so as to be displaceable against a spring force, and a damping device (70) is arranged between the holder device (20) and the carrier (30), wherein the holder device (20) is guided in one of the guide bushings (50) secured to the carrier (30), and the guide bushing (50) is supported in a vibration-damped manner on the carrier (30).

10 Claims, 4 Drawing Sheets

(56) References Cited

U.S. PATENT DOCUMENTS

| | | | | |
|---|---|---|---|---|
| 5,871,234 | A * | 2/1999 | Umemura | B60Q 5/003 280/731 |
| 6,036,223 | A * | 3/2000 | Worrell | B60R 21/2035 280/728.2 |
| 7,322,602 | B2 * | 1/2008 | Tsujimoto | B60Q 5/003 200/61.54 |
| 7,360,786 | B2 * | 4/2008 | Tsujimoto | B60Q 5/003 200/61.55 |
| 8,556,292 | B2 * | 10/2013 | Umemura | B60R 21/203 280/731 |
| 8,985,623 | B2 * | 3/2015 | Kondo | B60R 21/2037 280/731 |
| 2009/0218739 | A1 | 9/2009 | Terada et al. | |
| 2011/0120258 | A1 | 5/2011 | Kondo et al. | |
| 2013/0026741 | A1 | 1/2013 | Onohara | |

FOREIGN PATENT DOCUMENTS

| | | |
|---|---|---|
| EP | 1 671 854 A1 | 6/2006 |
| EP | 2 085 290 A1 | 8/2009 |
| JP | 2011-110941 | 6/2011 |
| JP | 2012-56461 | 3/2012 |

* cited by examiner

DEVICE FOR DAMPING VIBRATIONS OF AN AIRBAG OR AN AIRBAG APPARATUS

CROSS REFERENCE TO RELATED APPLICATIONS

This application claims priority to German Patent Application No. 10 2013 002 557.5, filed on Feb. 15, 2013 and PCT International Patent Application No. PCT/EP2014/052701, filed on Feb. 12, 2014.

FIELD OF THE INVENTION

The invention relates to an apparatus for damping vibrations of an airbag or airbag device having a holder device for securing the airbag or the airbag device to a carrier, wherein the holder device is secured to the carrier in a displaceable manner against a spring force, and a damping device is arranged between the holder device and the carrier.

BACKGROUND OF THE INVENTION

DE 39 25 761 A1 shows a vibration suppression apparatus for a steering wheel with an airbag, which has a gas generator and an airbag. The airbag unit or a part thereof is attached to the steering wheel body by an elastic means. In this way, the vibrations of the steering wheel can be suppressed without an additional damping mass. The elastic means can have a collar, which can be secured by a fastening means, for example a screw, to a tubular elastic part fitted over the collar.

DE 196 53 684 A1 relates to an arrangement for securing an airbag unit to a steering wheel, wherein at least one fastening point is provided for floating support of the airbag unit. The floating support is achieved by means of an elastically deformable bushing, which is arranged on a fastening screw and is at least partially in contact with same.

The object of the present invention is to provide an improved apparatus with which a simple relative motion with simultaneously easy adaptability to different uses is made possible.

SUMMARY OF THE INVENTION

According to the present invention, the above described object is accomplished by means of an apparatus having the features described herein. Advantageous embodiments and further modifications of the invention are described by the description, and the figures.

The apparatus according to the present invention for damping vibrations of an airbag or an airbag device having a holder device for fastening the airbag or the airbag device to a carrier, wherein the holder device is secured on the carrier and can be displaced against a spring force and a damping device is arranged between the holder device and the carrier. The holder device is guided in a guide bushing secured to the carrier, and the guide bushing is, in turn, supported on the carrier in a vibration-damped manner. In this way, it is possible to simply adjust the holder device with respect to a sliding friction coefficient, or to other mechanical properties, by changing the guide bushing, and furthermore configure the vibration damping properties of the apparatus independently of the holder device.

The guide bushing can be configured to be electrically insulating in order to be able to also use the fastening element as a through-connection for a horn switch.

The guide bushing can have positive locking elements on its outer circumference, in which elements a damping bushing is held in a positive locking manner. The damping bushing damps the relative motions between the airbag apparatus and the carrier; the design in the form of a bushing has the advantage of easy adaptability as well as axial and radial damping.

On its outer circumference, the damping bushing can have at least one receptacle for a positive locking attachment of the carrier, in particular in the form of an outer circumferential groove, so that the carrier can be supported in a positive locking manner in the receiver bushing.

At least one insulating element can be arranged between the guide bushing and the damping bushing, ensuring that no undesired electrical current conduction occurs.

The electrically insulating element and the damping bushing can be coupled to one another in the radial direction and/or in the circumferential direction via the positive locking elements, so that twisting or undesired relative motion in the radial direction is not possible.

A sheath which is secured to the carrier in particular by spraying, can be arranged between the carrier and the damping bushing, which sheath can be configured, on the one hand, to be electrically insulating, and, on the other hand, to be vibration damping.

A spring can be arranged between the carrier and the holder device, which spring is not supported on the guide bushing or on the vibration damping elements in order to ensure decoupling of the forces exerted by the vibration damping components.

A stop acting in the direction of displacement of the holder device can be provided on the apparatus in order to implement a movement limitation. The stop can be configured as a separate element.

The carrier for the airbag unit is preferentially configured as a steering wheel.

BRIEF DESCRIPTION OF THE DRAWINGS

Exemplary embodiments of the invention will be explained in more detail below with reference to the enclosed figures, which show.

DETAILED DESCRIPTION OF THE INVENTION

Figure 1:
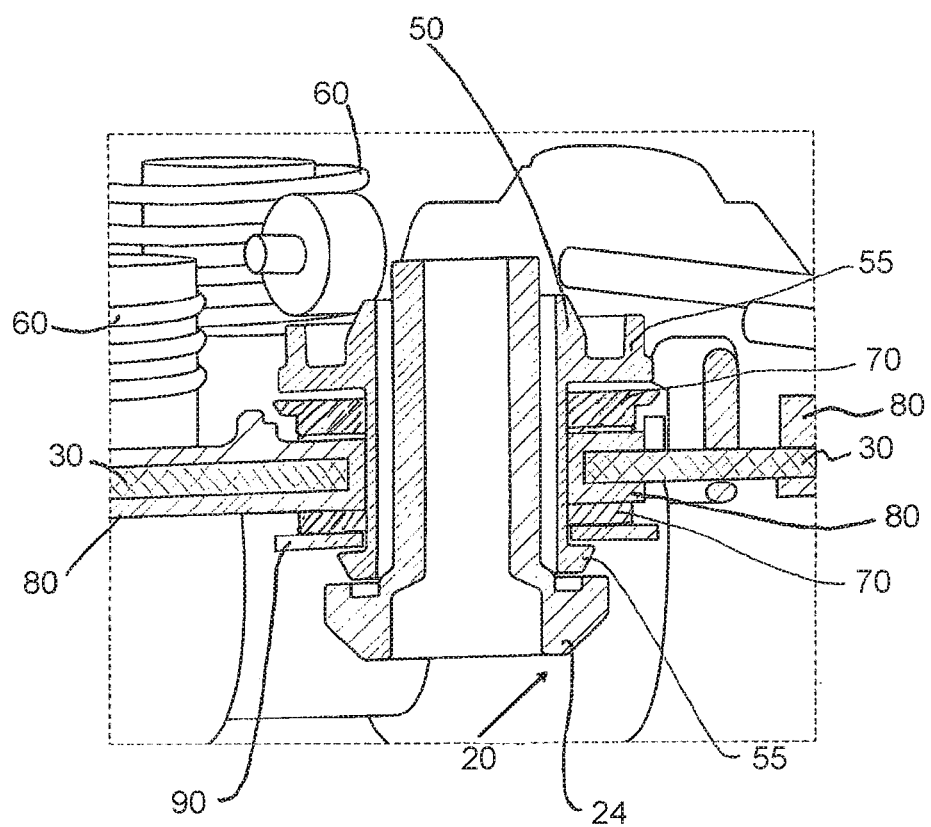
FIG. 1 is a sectional representation of a first embodiment.

FIG. 1 shows a schematic sectional representation of an apparatus for damping vibrations of an airbag, which is not shown, or of an airbag device with a holder device 20, of which an anti-friction bushing for receiving the airbag unit is shown. The airbag unit is secured via a bolt, which is not shown, to the upper end of the anti-friction bushing 24, and can be displaced along the length of the anti-friction bushing 24.

The anti-friction bushing 24 is displaceably supported in a guide bushing 50, which, in turn, has positive locking elements 55 in the form of projections at its upper and lower ends in order to prevent the displacement of the guide bushing in the axial direction, in other words, upward or downward in FIG. 1. A damping bushing 70 is arranged within the groove formed by the positive locking elements 55, which, in the shown exemplary embodiment, is secured in the circumferential direction relative to the guide bushing 50, and thus prevents twisting about the longitudinal axis. The damping bushing 70 is used for damping the vibrations, especially in the axial direction, but can also dampen radial components or vibrations in the circumferential direction to receive the vibrations, especially in the axial direction, but can also receive radial components or vibrations in the circumferential direction. In the damping bushing 70, there are receptacles, which are provided to receive a carrier 30, for example, in the form of recesses, of a groove, or the like. In the shown exemplary embodiment, the carrier 30, on which the airbag or the airbag device is ultimately supported, is enclosed by a sheath 80, which likewise has a shock damping effect and can be configured of plastic, in particular foam material. Apart from a mechanical damping property, the sheath 80 can also provide electrical insulation. An insulating element 90 is arranged below the damping bushing 70 in order to provide an additional electrical insulation of the holder device 20. An accordingly configured electrical insulation element 90 can be arranged above the damping bushing 70 and electrically insulate the damping bushing 70 relative to the guide bushing 50.

Outside the holder device 20 and the guide bushing 50 and the damping bushing 70, there are springs 60 arranged on the carrier 30 which support the airbag device against the carrier 30, and press the airbag device into the initial position. The airbag device can be provided with electrical contacts in order, for example, to actuate the horn. FIG. 1 shows that the springs 60 are arranged separately from the apparatus in order to damp vibrations so as to separate the damping effect from the effect of the exerted spring force.

Figure 2:
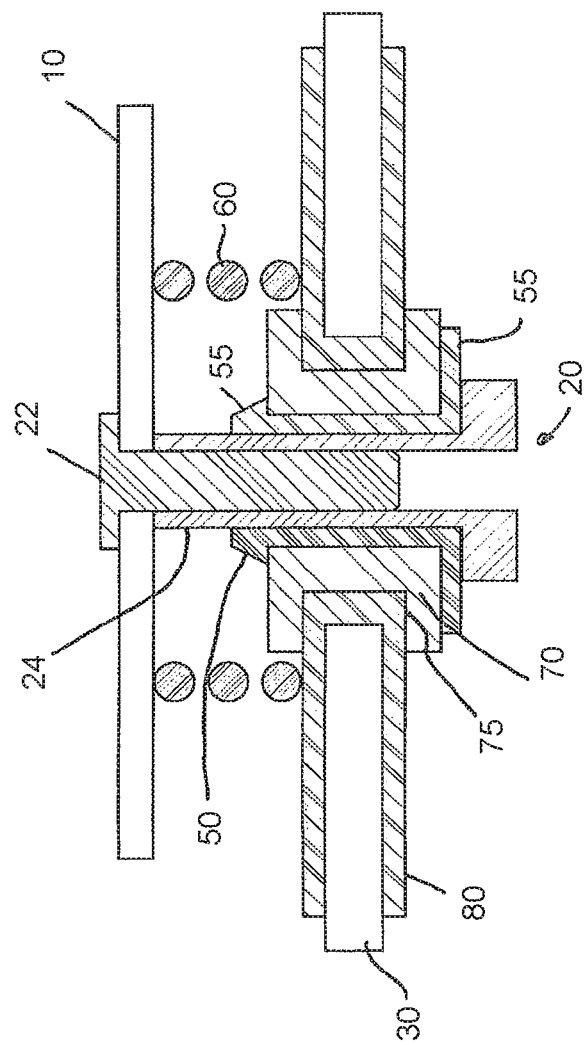
FIG. 2 is a schematic sectional representation of a variant of the invention.

One variant of the invention is shown in FIG. 2, in which an airbag device 10 is schematically shown in the form of a part of a housing. The airbag device 10 is coupled to the holder device 20 by means of a bolt 22, which is screwed into an anti-friction bushing 24 with internal thread. The anti-friction bushing 24 is mounted in the guide bushing 50 longitudinally displaceable against the spring force of the springs 60, and, in the shown exemplary embodiment, can be displaced downward against the spring force. The guide bushing 50 respectively has positive locking elements 55 in the form of projections at its upper and lower end, which projections, in turn, secure the damping bushing 70 both in the direction of the longitudinal displaceability of the anti-friction bushing 24 and in the radial direction. The damping bushing 70 has receptacles 75, which are arranged on its outer circumference, and form a surrounding groove into which the carrier 30 with the sheath 80 is inserted.

The spring 60 is configured as a pressure spring and arranged around the holder device 20. The stop in the guide bushing 24 at the end opposite the bolt 22 prevents the airbag device 10 from moving further than as in the illustrated position. The sheath 80 can be adhered to the carrier 30 or arranged in a different manner, for example, within insert molding. The spring 60 itself is supported on the optionally vibration damping and electrically insulating sheath 80, but not on the guide bushing 50, or on the damping bushing 70 in order to prevent the transmission of vibrations.

Figure 3:
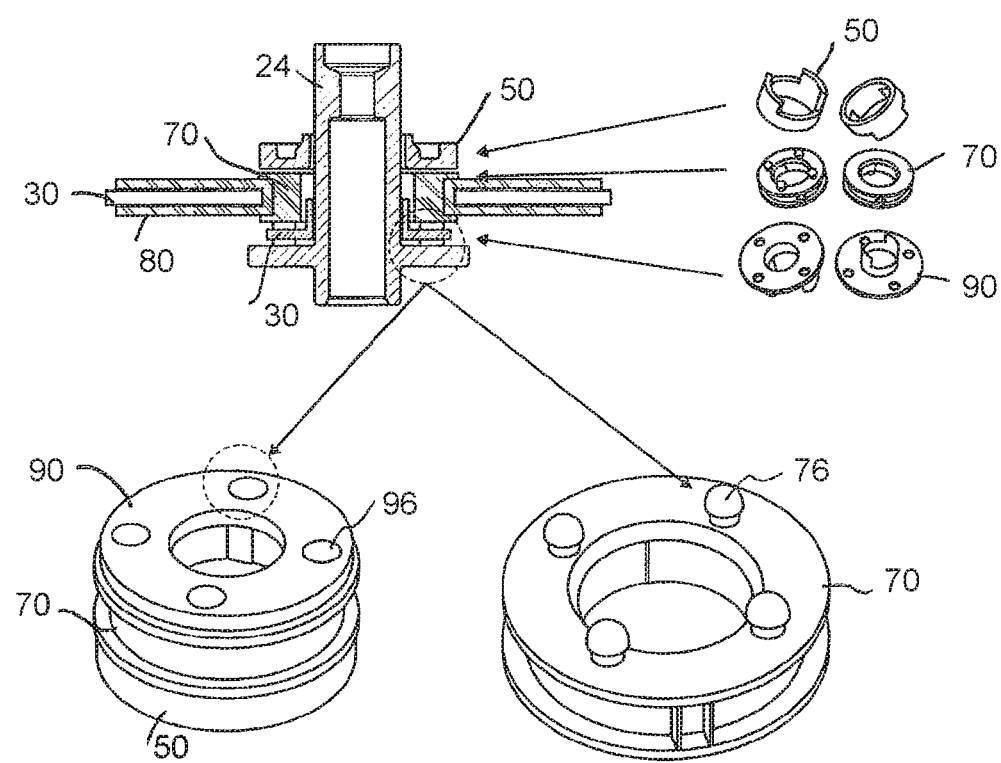
FIG. 3 shows individual representations of components and a sectional representation in the assembled state.

FIG. 3 shows a further variant of the invention in a schematic sectional representation, in which the damping bushing 70 is secured in a positive locking manner to the carrier 30 with the sheath. The damping bushing 70 is mounted in the guide bushing 50. The insulating element 90, which has an L-shaped cross section, in other words a vertical, cylindrical wall and a horizontal angle thereto, is arranged below the guide bushing 50. Positive locking elements 76 in the form of bumps oriented in the axial direction, on which the insulating element 90 is mounted with correspondingly configured recesses, are arranged on the damping bushing 70 in order to prevent twisting of the insulating element 90 relative to the damping bushing 70. The positive locking elements 76 have an undercut, so that the insulating element 90 can be latched in place, and a displacement either in the axial direction or in the circumferential direction cannot occur. The guide bushing is fitted into the bore hole of the damping bushing 70 and guides the holder device 20, more precisely the anti-friction bushing 24, relative to the carrier 30. The insulating element 90 can likewise perform a guide function, as it is mounted in a damping manner on the damping bushing 70. In the shown exemplary embodiment, the positive locking elements 76 protrude through the recesses 96 in the insulating element 90 and are supported on the flange of the anti-friction bushing 24, so that the anti-friction bushing 24 likewise is supported in a damping manner. In the status shown, the anti-friction bushing 24 is secured via the damping bushing 70 to the carrier 30, so that there is no direct contact between the carrier 30 and the anti-friction bushing 24 without the damping element being interposed. The guide bushing 24 is, in this way, also decoupled from the insulating element 90 in terms of vibration. The damping of the anti-friction bushing 24 leads to a reduction of the noise levels because there is an acoustic coupling, but the transmission of vibrations is at least reduced.

Figure 4:
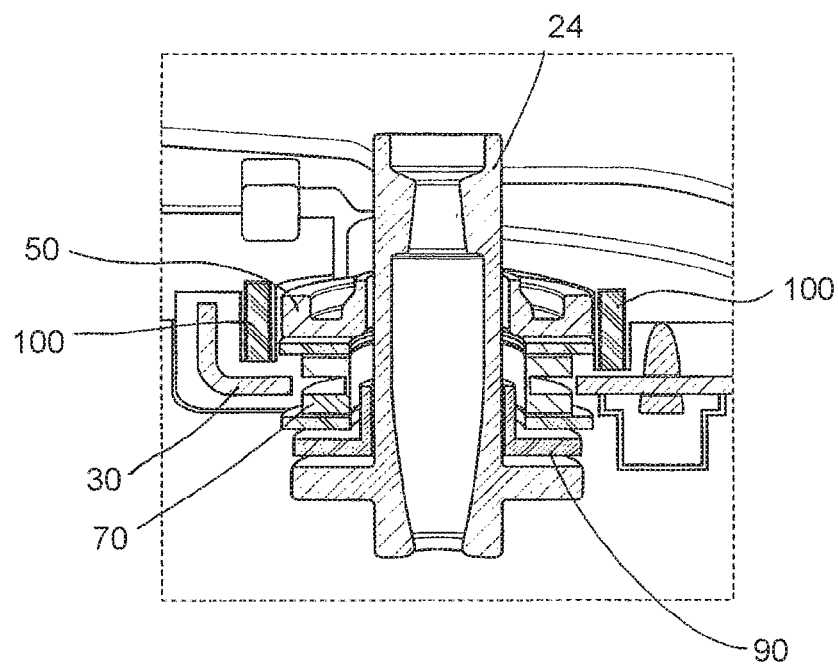
FIG. 4 is a sectional representation with an upper stop element.
Figure 5:
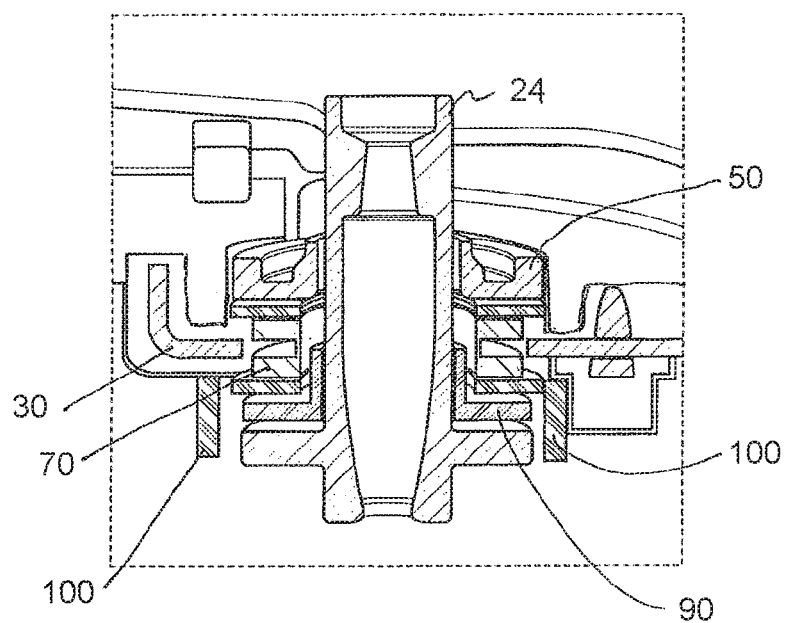
FIG. 5 is a sectional representation with a lower stop element.

A further variant of the device is shown in FIGS. 4 and 5, in which the anti-friction bushing 24 is supported in the guide bushing 50, in the damping bushing 70, and in the sheathed carrier 30. In FIG. 4, a stop element 100 is arranged on the upper side in order to prevent an excessive compression of the springs 60 during the displacement of the airbag device 10, which is not shown, in the direction of the carrier 30, and furthermore to prevent damage either to the airbag device or to the holder device 20. In FIG. 5, the stop 100 is arranged on the lower side, in other words on the side of the carrier 30 facing away from the airbag, in case a displacement of the carrier downward should structurally be provided. The stop 100 can be configured as a circumferential ring element; it is likewise possible that the stop 100 consists of several components, which prevent a relative motion between the airbag 10 and the carrier beyond the predetermined extent. The stop 100 is preferentially arranged on the carrier 30 or on the sheath 80, and the carrier 30 can itself be configured as a horn plate, steering wheel, or part of the steering wheel.

While the above description constitutes the preferred embodiment of the present invention, it will be appreciated that the invention is susceptible to modification, variation and change without departing from the proper scope and fair meaning of the accompanying claims.

The invention claimed is:

1. An apparatus for damping vibrations of an airbag or an airbag device comprising, a holder device for fastening the airbag or the airbag device to a carrier, wherein the holder device is fixed on the carrier so as to be displaceable counter to a spring force exerted by a spring, and a damping bushing is arranged between the holder device and the carrier, the holder device is guided in a guide bushing fixed on the carrier, and the guide bushing is mounted on the carrier in a vibration-damped manner, wherein the apparatus further comprises a sheath fastened to and substantially enclosing the carrier and arranged between the carrier and the damping bushing, and wherein the spring is supported directly on the sheath.

2. An apparatus according to claim 1, further comprising in that the guide bushing is designed to be electrically non-conductive.

3. An apparatus according to claim 1, further comprising in that the outer periphery of the guide bushing has interlocking elements in which the damping bushing is retained in an interlocking manner.

4. An apparatus according to claim 1, further comprising in that at least one electrically non-conductive insulating element is arranged between the guide bushing and the damping bushing.

5. An apparatus according to claim 4, further comprising in that the electrically non-conductive insulating element and the damping bushing are coupled to each other in an interlocking manner in the radial direction or the circumferential direction via interlocking elements.

6. An apparatus according to claim 1, further comprising in that the holder device has an anti-friction element with an internal thread, and a bolt.

7. An apparatus according to claim 1, further comprising in that a stop element which is effective in the direction of displacement of the holder device is provided.

8. An apparatus according to claim 1, further comprising in that the carrier is a component of a steering wheel.

9. An apparatus for damping vibrations of an airbag or an airbag device comprising, a holder device for fastening the airbag or the airbag device to a carrier, wherein the holder device is fixed on the carrier so as to be displaceable counter to a spring force exerted by a spring, and a damping bushing is arranged between the holder device and the carrier, the holder device is guided in a guide bushing fixed on the carrier, and the guide bushing is mounted on the carrier in a vibration-damped manner, wherein the apparatus further comprises a sheath fastened to and substantially enclosing the carrier and arranged between the carrier and the damping bushing, wherein the outer periphery of the guide bushing has interlocking elements in which the damping bushing is retained in an interlocking manner, and wherein the outer periphery of the damping bushing has at least one receptacle for the interlocking fixing of the carrier.

10. An apparatus for damping vibrations of an airbag or an airbag device comprising, a holder device for fastening the airbag or the airbag device to a carrier, wherein the holder device is fixed on the carrier so as to be displaceable counter to a spring force exerted by a spring, and a damping bushing is arranged between the holder device and the carrier, the holder device is guided in a guide bushing fixed on the carrier, and the guide bushing is mounted on the carrier in a vibration-damped manner, and where the apparatus further comprising in that the spring is not supported on the guide bushing or vibration damping elements and is arranged between the carrier and the holder device.

* * * * *